Feb. 3, 1931.  K. O. LEON  1,790,869
DOUBLE ROW BALL OR ROLLER BEARING
Filed March 15, 1928   2 Sheets-Sheet 1
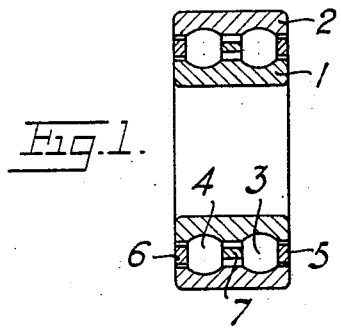 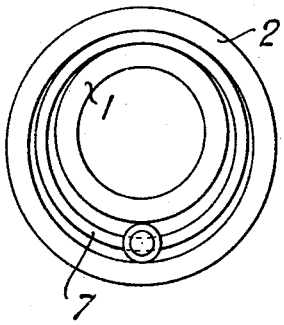
Fig.1.  Fig.2.
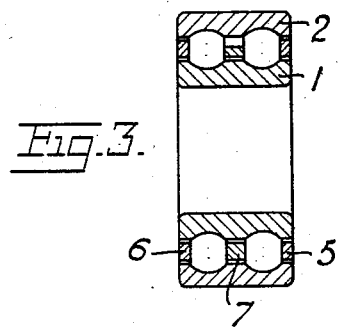 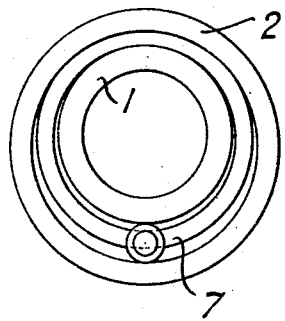
Fig.3.  Fig.4.
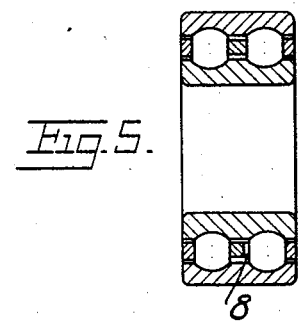 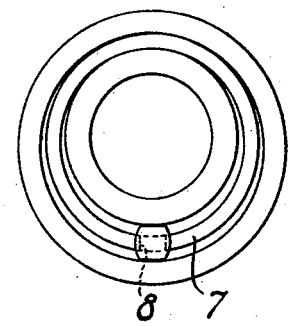
Fig.5.  Fig.6.
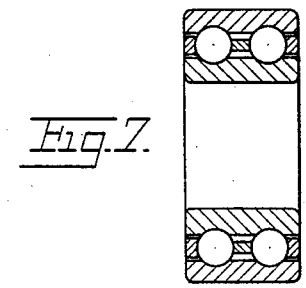 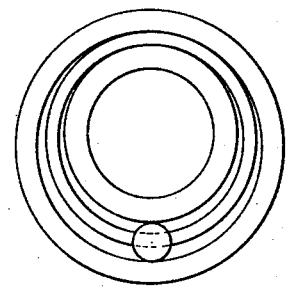
Fig.7.  Fig.8.
Inventor
Karl Oskar Leon,
By
atty.

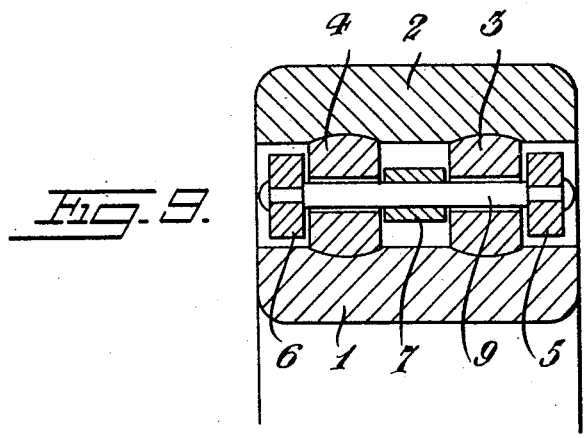
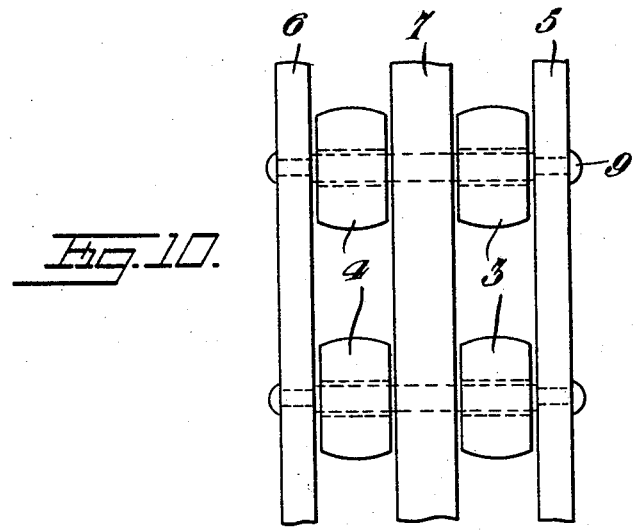

Patented Feb. 3, 1931

1,790,869

UNITED STATES PATENT OFFICE

KARL OSKAR LEON, OF LIDKOPING, SWEDEN

DOUBLE-ROW BALL OR ROLLER BEARING

Application filed March 15, 1928, Serial No. 261,891, and in Sweden April 22, 1927.

This invention relates to double-row ball or roller bearings of the type having raceway grooves in both of the bearing rings.

The object of this invention is to permit the use of uninterrupted raceway grooves in such bearings without materially reducing the strength of the bearing.

To this end I provide between the two rows of balls or rollers a retaining or spacing ring of a radial thickness relatively to the distance between the bearing rings such as to permit a displacement of the bearing rings relatively to each other to allow the rollers or balls to be inserted therebetween. The retaining or spacing members outside the rows of balls or rollers, however, are of a radial thickness which corresponds substantially to the distance between the bearing rings when situated concentrically relatively to each other, thereby securing sufficient strength of the entire bearing structure.

In the accompanying drawing several embodiments of the invention are illustrated.

Figure 1 is an axial section of a roller bearing according to one embodiment of the invention.

Fig. 2 is a side elevation of the same bearing.

Figs. 3 and 4 are similar views of a roller bearing according to a second embodiment.

Figs. 5 and 6 are similar views of a roller bearing according to a third embodiment.

Figs. 7 and 8 are axial section and side elevation, respectively, of a ball bearing of a design equivalent to that shown in Figs. 1 and 2.

Fig. 9 is a partial axial section on a larger scale of a roller bearing according to the invention showing the method of uniting the separate cage members to form a single cage.

Fig. 10 is a fragmentary plan view of a portion of the assembled cage and rollers.

In the roller bearing shown in Figs. 1 and 2 the inner bearing 1 and the outer bearing ring 2 are formed with continuous and uninterrupted raceway grooves to receive two rows of rollers 3, 4. In the assembled bearing, Fig. 1, the rollers of both rows are held at their outer ends by retaining members 5, 6 in the shape of smooth rings, a likewise smooth retaining ring 7 being inserted between the two rows. While the outer retaining rings 5, 6 are of a radial thickness which corresponds substantially to the radial extension of the space between the bearing rings 1, 2, the inner retaining ring 7 is of a considerably smaller radial thickness. To space the rollers apart in peripheral direction any suitable means desired may be used, as bolts or rivets 9.

In assembling the bearing the inner ring 1 is first displaced relatively to the outer ring, as shown in Fig. 2. Then the rollers of one row, as 3, are successively inserted in the space between the rings 1 and 2. After the requisite number of rollers 3 have been inserted the retainer 7 is introduced till it comes to lie against the inner end of the rollers inserted. The radial thickness of the retaining ring 7 corresponds to the narrowest space between the bearing rings, when displaced, as shown in Fig. 2. The remaining row of rollers, in the case assumed the rollers 4, are then inserted in the same way as described in connection with the rollers 3. After both rows have been provided with the requisite number of rollers, the bearing rings 1 and 2 are again moved to concentric position relatively to each other and the rollers are spaced apart in the required manner. The outer retaining rings 5 and 6 are then applied and the rollers connected thereto in the relative positions desired.

The embodiment shown in Figs. 3, 4 differentiates from that above described in that the radial thickness of the intermediate retaining ring 7 is reduced along a portion only of its peripheral length, the radial thickness of the remaining portion of said retaining ring being substantially equal to that of the outer retainers 5, 6.

Figs. 5, 6 illustrate a roller bearing in which the axial length of the rollers is shorter than the diameter of the rollers. The rollers are in such case inserted with said shorter dimension extending radially relatively to the bearing rings, as shown in Fig. 6. The displacement of the bearing rings relatively to each other need, as a result, only correspond to said shorter dimension and not to the diameter of the rollers. In order that the rollers, when inserted, can be turned to proper position the intermediate retaining ring 7 is formed with a filling notch 8 at one side. The retaining ring 7 may for the rest be of the design shown in Figs. 1, 2 or of the design shown in Figs. 3, 4.

Figs. 7 and 8 illustrate a bearing of a design equivalent to that shown in Figs. 1 and 2 but with balls instead of rollers.

It is to be noted that also in connection with the bearing shown in Figs. 3 and 4 the rollers may be replaced by balls.

The rings 5, 6 and 7 are separate members held together by axial bolts or rivets 9 which extend through holes formed in the rollers and corresponding holes formed in said rings. This method of assembling is well-known per se. By these bolts the rings 5 and 6 are thus retained in position.

The center ring 7 is necessary in bearings having curved generatrices because of the fact that the ball cage will otherwise have a tendency to displace the rollers inward towards the center of the bearing so as to cause them to roll with their center planes on the inside of the planes that may be laid through the center points of the races, with the result that the rollers will be subjected to a high wedge pressure.

What I claim is:

1. In an anti-friction bearing of the type comprising an inner race ring having two continuous grooved raceways therein, an outer race ring having two continuous grooved raceways therein, two rows of anti-friction members engaging said raceways in both rings, the provision of a cage comprising three separate annular members including a central member to be inserted between the race rings before the insertion of the anti-friction member therebetween, said central member having a radial dimension which is small as compared with the radial distance between the two race rings when situated concentrically relatively to each other to allow the race rings to be sufficiently displaced radially relatively to each other for the insertion of the anti-friction members therebetween, the two remaining members of the cage being adapted to be inserted outside each individual row of anti-friction members after the race rings have been adjusted to concentric position relatively to each other with the anti-friction members inserted between them, said remaining cage members being of a radial thickness substantially equal to the radial distance between the race rings.

2. In an anti-friction bearing of the type comprising an inner race ring having two continuous grooved raceways therein, an outer race ring having two continuous grooved raceways therein, two rows of anti-friction members engaging said raceways in both rings, the provision of a cage comprising three separate annular members including a central member to be inserted between the race rings before the insertion of the anti-friction members therebetween, said central member having a reduced radial thickness along a portion of its peripheral length to allow the race rings to be sufficiently displaced radially relatively to each other for the insertion of the anti-friction members therebetween, the two remaining members of the cage being of a radial thickness substantially equal to the radial distance between the race rings.

3. A roller bearing comprising an inner race ring having two continuous grooved raceways therein, an outer race ring having two continuous grooved raceways therein, two rows of rollers engaging said raceways in both rings, the axial length of each roller being shorter than its diameter, a cage comprising two outer annular members, and a central member having a radial dimension of smaller diameter than the radial distance between the two race rings when situated concentrically relatively to each other to allow the race rings to be sufficiently displaced relatively to each other for the insertion of the rollers therebetween, said central member having a notch in one side to permit swinging of the rollers from edgewise to working position, the two outer members of the cage being adapted to be inserted outside each individual row of rollers after the race rings have been adjusted to concentric position relatively to each other with the rollers inserted between them, said outer members being of a radial thickness substantially equal to the radial distance between the race rings.

In testimony whereof I have signed my name.

KARL OSKAR LEON.